(12) United States Patent
Diab et al.

(10) Patent No.: US 10,543,757 B2
(45) Date of Patent: Jan. 28, 2020

(54) TECHNIQUES FOR ADJUSTING WAKEUP TIME OF AN ELECTRIFIED VEHICLE FOR LOW VOLTAGE BATTERY CONDITIONING

(71) Applicants: Moustapha Diab, Auburn Hills, MI (US); Feisel Weslati, Troy, MI (US)

(72) Inventors: Moustapha Diab, Auburn Hills, MI (US); Feisel Weslati, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 74 days.

(21) Appl. No.: 15/837,534

(22) Filed: Dec. 11, 2017

(65) Prior Publication Data

US 2019/0176642 A1 Jun. 13, 2019

(51) Int. Cl.
| | | |
|---|---|---|
| *B60L 58/21* | (2019.01) | |
| *B60W 20/00* | (2016.01) | |
| *H02J 7/00* | (2006.01) | |
| *B60L 58/12* | (2019.01) | |

(52) U.S. Cl.
CPC .............. *B60L 58/21* (2019.02); *B60L 58/12* (2019.02); *B60W 20/00* (2013.01); *H02J 7/0054* (2013.01); *B60L 2210/10* (2013.01); *H02J 2007/0059* (2013.01); *Y10S 903/907* (2013.01)

(58) Field of Classification Search
CPC .............................. B60L 11/1864; B60L 58/21
See application file for complete search history.

(56) References Cited

U.S. PATENT DOCUMENTS

| | | | | |
|---|---|---|---|---|
| 7,839,116 B2 * | 11/2010 | Esaka | ...................... | B60K 6/28 320/103 |
| 2011/0168462 A1 | 7/2011 | Stanek et al. | | |
| 2015/0258911 A1 * | 9/2015 | Sugiyama | ................. | B60L 1/00 701/22 |
| 2016/0090000 A1 * | 3/2016 | Eifert | .................. | B60L 11/1861 320/148 |
| 2016/0303992 A1 * | 10/2016 | Lovett | .................... | B60W 50/14 |
| 2017/0088003 A1 | 3/2017 | Yu et al. | | |
| 2017/0197521 A1 * | 7/2017 | Park | .................... | B60L 11/1859 |

FOREIGN PATENT DOCUMENTS

EP 2743140 A1 6/2014

OTHER PUBLICATIONS

International Search Report and Written Opinion dated Apr. 4, 2019 for International Application No. PCT/US2018/064382, International Filing Dated Dec. 7, 2018.

* cited by examiner

*Primary Examiner* — Joseph T Phan
(74) *Attorney, Agent, or Firm* — Ralph E Smith

(57) ABSTRACT

A control system for an electrified vehicle having low and high voltage battery systems includes a set of vehicle modules that collectively draw an ignition-off draw (IOD) current from the low voltage battery system while the vehicle is off, a set of sensors configured to measure a set of parameters of at least one of the low and high voltage battery systems, and a controller configured to: estimate the IOD current, receive the set of measured parameters from the set of sensors, based on the set of measured parameters and the estimated IOD current, set a wakeup time indicative of a future time at which the low voltage battery system will require recharging, and based on the wakeup time, temporarily wakeup the vehicle such that recharging of the low voltage battery system using the high voltage battery system is enabled.

17 Claims, 2 Drawing Sheets

TECHNIQUES FOR ADJUSTING WAKEUP TIME OF AN ELECTRIFIED VEHICLE FOR LOW VOLTAGE BATTERY CONDITIONING

FIELD

The present application generally relates to electrified vehicles and, more particularly, to techniques for adjusting a wakeup time of an electrified vehicle for periodic conditioning of a low voltage battery system.

BACKGROUND

An electrified vehicle includes at least one battery system, at least one electric motor, and an optional internal combustion engine. For example, an electrified vehicle could include a high voltage battery system and a low voltage (e.g., 12 volt) battery system. In such a configuration, the high voltage battery system is utilized to recharge the low voltage battery system via a direct current to direct current (DC-DC) converter. The low voltage battery system is utilized to power low voltage components of the vehicle and, for certain applications, to start an engine. While the electrified vehicle is off or asleep, a main contactor is open that disconnects the high voltage battery system. Over time, the low voltage battery system could drain below a critical threshold level. If this occurs, some of the vehicle's systems could be rendered inoperable. Accordingly, while such electrified vehicle control systems work well for their intended purpose, there remains a need for improvement in the relevant art.

SUMMARY

According to one example aspect of the invention, a control system for an electrified vehicle having low and high voltage battery systems is presented. In one exemplary implementation, the control system comprises: a set of vehicle modules that collectively draw an ignition-off draw (IOD) current from the low voltage battery system while the vehicle is off; a set of sensors configured to measure a set of parameters of at least one of the low and high voltage battery systems; and a controller configured to: estimate the IOD current, receive the set of measured parameters from the set of sensors, based on the set of measured parameters and the estimated IOD current, set a wakeup time indicative of a future time at which the low voltage battery system will require recharging, and based on the wakeup time, temporarily wakeup the vehicle such that recharging of the low voltage battery system using the high voltage battery system is enabled.

In some implementations, the controller is configured to initially perform a conservative estimate of the IOD current based on which of the set of vehicle modules are active. In some implementations, upon temporarily waking up the vehicle, the controller is further configured to relearn the wakeup time by: determining a current state of charge (SOC) of the low voltage battery system, based on the estimate IOD current, determining an expected SOC of the low voltage battery system, and adjusting the estimated IOD current based on a difference between the current and expected SOC of the low voltage battery system.

In some implementations, the wakeup time is a wakeup timer and the controller initiates the wakeup timer upon the vehicle turning off and, when the wakeup timer expires, the controller temporarily wakes up the vehicle. In some implementations, the set of parameters includes at least one of a capacity of the low voltage battery system, ambient temperature, a state of charge of the low and high voltage battery systems before the vehicle was turned off, and a time of day. In some implementations, the control system further comprises a main contactor disposed between a direct current to direct current (DC-DC) converter and the high voltage battery system, the DC-DC converter also being connected to the low voltage battery system, wherein the controller is configured to open the main contactor while the vehicle is off and close the main contactor while the vehicle is temporarily woken up such that the DC-DC converter steps down a voltage of the high voltage battery system for recharging of the low voltage battery system.

In some implementations, the vehicle is a plug-in hybrid electric vehicle (PHEV) that is configured to recharge the high voltage battery system via wall power, and wherein the set of parameters includes a current state of charge (SOC) of the high voltage battery system. In some implementations, the set of vehicle modules includes at least one of a body controller module, an on-board charger module, a power inverter module, a battery pack control module, and an intelligent battery sensor. In some implementations, the set of vehicle modules includes any vehicle modules actively communicating on a controller area network (CAN).

According to another example aspect of the invention, a method for controlling recharging of a low voltage battery system of an electrified vehicle that also includes a high voltage battery system is presented. In one exemplary implementation, the method comprises: operating a set of vehicle modules that collectively draw an ignition-off draw (IOD) current from the low voltage battery system while the vehicle is off, receiving, by a control system of the vehicle and from a set of sensors, a set of measured parameters of at least one of the low and high voltage battery systems, estimating, by the control system, the IOD current, based on the set of measured parameters and the estimated IOD current, determining, by the control system a wakeup time indicative of a future time at which the low voltage battery system will require recharging, and based on the wakeup time, temporarily waking up the vehicle, by the control system, such that recharging of the low voltage battery system using the high voltage battery system is enabled.

In some implementations, the method further comprises initially performing, by the control system, a conservative estimate of the IOD current based on which of the set of vehicle modules are active. In some implementations, the method further comprises upon temporarily waking up the vehicle, relearning the wakeup time by: determining, by the control system, a current state of charge (SOC) of the low voltage battery system, based on the estimate IOD current, determining, by the control system, an expected SOC of the low voltage battery system, and adjusting, by the control system, the estimated IOD current based on a difference between the current and expected SOC of the low voltage battery system.

In some implementations, the wakeup time is a wakeup timer and further comprising: initiating, by the control system, the wakeup timer upon the vehicle turning off, and when the wakeup timer expires, temporarily waking up, by the control system, the vehicle. In some implementations, the set of parameters includes at least one of a capacity of the low voltage battery system, ambient temperature, a state of charge of the low and high voltage battery systems before the vehicle was turned off, and a time of day. In some implementations, a main contactor is disposed between a direct current to direct current (DC-DC) converter and the high voltage battery system, the DC-DC converter also being connected to the low voltage battery system, and the method further comprises: opening, by the control system, the main contactor while the vehicle is off, and closing, by the control system, the main contactor while the vehicle is temporarily woken up such that the DC-DC converter steps down a voltage of the high voltage battery system for recharging of the low voltage battery system.

In some implementations, the vehicle is a plug-in hybrid electric vehicle (PHEV) that is configured to recharge the high voltage battery system via wall power, and wherein the set of parameters includes a current state of charge (SOC) of the high voltage battery system. In some implementations, the set of vehicle modules includes at least one of a body controller module, an on-board charger module, a power inverter module, a battery pack control module, and an intelligent battery sensor. In some implementations, the set of vehicle modules includes any vehicle modules actively communicating on a controller area network (CAN).

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, an electrified vehicle's low voltage (e.g., 12 volt) battery system could drain over time to below a threshold level that could render some of the vehicle's systems inoperable. This could occur, for example, during extended vehicle off or sleep periods (e.g., weeks or months). This current drain is primarily due to ignition-off drain (IOD) current that is drawn from the low voltage battery system by various modules of the vehicle that are at least periodically active while the vehicle is off or asleep. Accordingly, techniques are presented for adjusting a wakeup time or timer of an electrified vehicle for low voltage battery conditioning. These techniques periodically wakeup the electrified vehicle according to a wakeup timer. While awake, a high voltage battery system is able to recharge the low voltage battery system via a direct current to direct current or DC-DC converter, thereby preventing the low voltage battery system voltage from draining below the threshold level.

Figure 1:
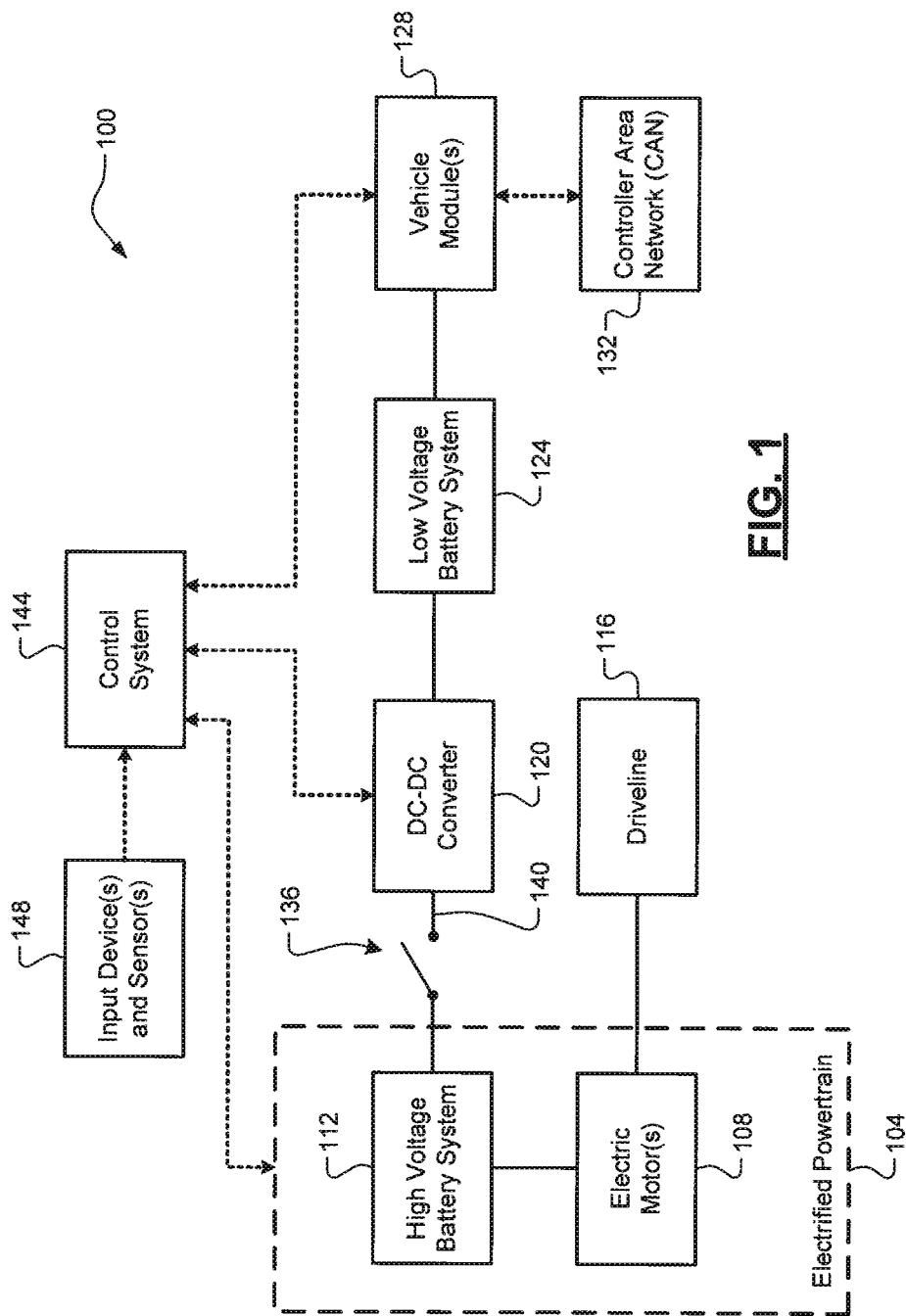
FIG. 1 is a functional block diagram of an example electrified vehicle according to the principles of the present disclosure.

Referring now to FIG. 1, a functional block diagram of an electrified vehicle 100 is illustrated. The vehicle 100 includes an electrified powertrain 104 comprising one or more electric motors 108. The electric motor(s) 108 are powered by a high voltage battery system 112 (e.g., a 16 kilowatt-hour (kWh) lithium-ion battery pack) and generate drive torque that is transferred to a driveline 116 of the vehicle 100. The vehicle 100 also includes a DC-DC converter 120 that steps down a voltage of the high voltage battery system 112 to a lower voltage, such as for recharging a low voltage (e.g., 12 volt) battery system 124. The low voltage battery system 124 powers a set of low voltage vehicle modules 128. In one exemplary implementation, at least some of these module(s) 128 actively communicate via a controller area network (CAN) 132. A main contactor 136 is disposed in a high voltage bus 140 between the high voltage battery system 112 and the DC-DC converter 120.

It will be appreciated that the vehicle 100 could be any suitable vehicle having both the high voltage battery system 112 and the low voltage battery system 124. Non-limiting examples of the vehicle 100 include a battery electric vehicle (BEV), a plug-in hybrid electric vehicle (PHEV), and a mild hybrid electric vehicle (HEV) such as a belt-driven starter generator (BSG) equipped vehicle. Thus it will also be appreciated that the vehicle 100 could include other components that are not illustrated, such as an internal combustion engine, a hybrid transmission, and the like. Non-limiting examples of the vehicle module(s) 128 include a body controller module that controls electronic door locks, instrument clusters, and the like, an on-board charger module that controls battery charging, a power inverter module, a battery pack control module, and an intelligent battery sensor. Any components that are in communication via the CAN 132 also heavily affect the IOD current.

A control system 144 controls operation of the vehicle 100. The control system 140 receives inputs from a set of input devices and/or sensors 148. Non-limiting examples of these input device(s)/sensor(s) 148 include an accelerator pedal that provides a driver torque request, a key on/off sensor for starting/stopping the electrified powertrain 104, an electric motor speed sensor, battery system state sensors such as the intelligent battery sensor mentioned above, and the like. The control system 144 is also referred to herein as a controller, but it will be appreciated that the vehicle 100 could include a plurality of different controllers. While the control system 144 is shown as being separate from the vehicle module(s) 128, it will be appreciated that each vehicle module 128 may also have its own associated controller.

Figure 2:
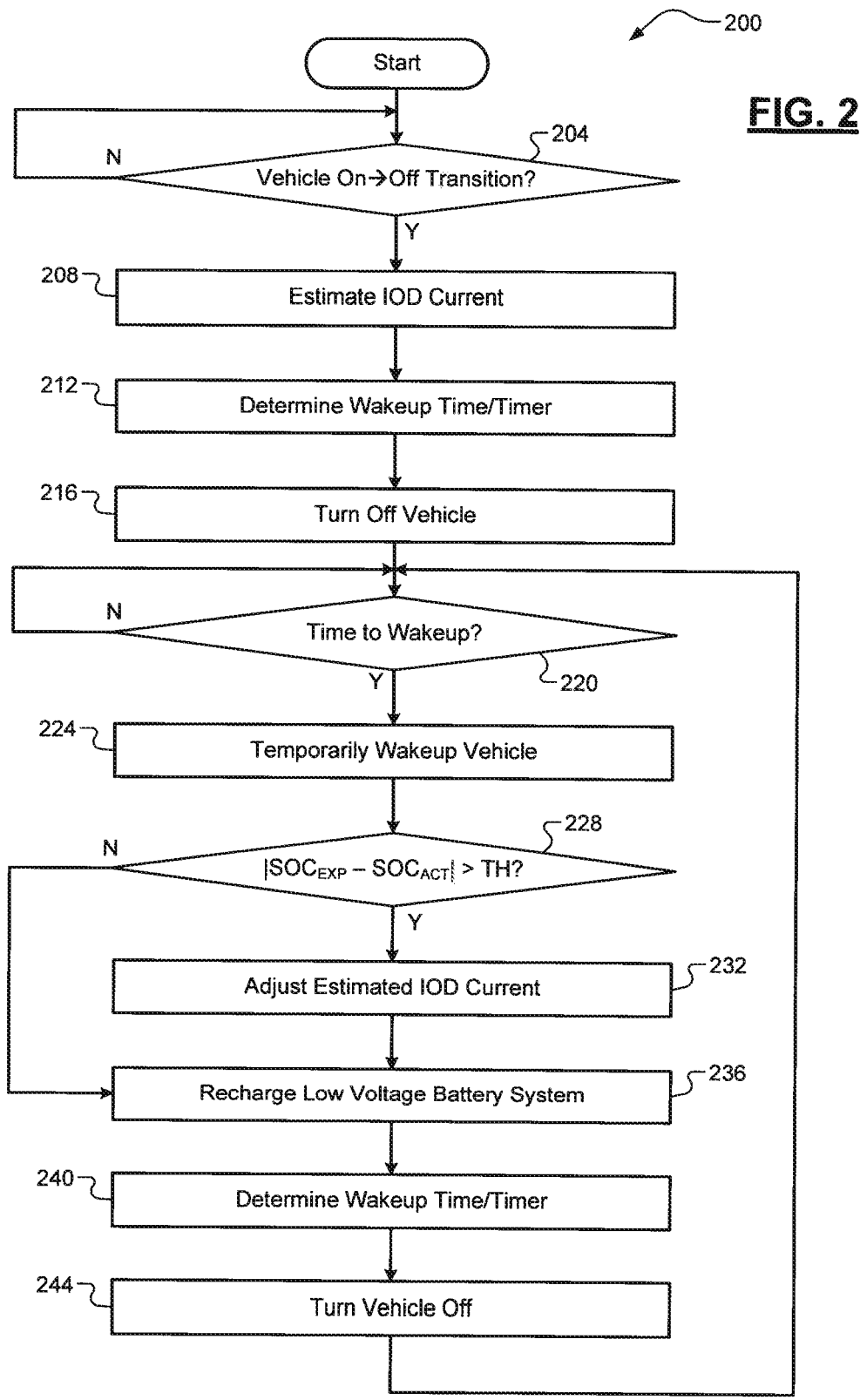
FIG. 2 is a flow diagram of an example method for adjusting the wakeup time of an electrified vehicle for low voltage battery conditioning according to the principles of the present disclosure.

Referring now to FIG. 2, a method 200 for controlling recharging of a low voltage battery system (e.g., low voltage battery system 124) of an electrified vehicle is illustrated. At 204, the control system 144 determines whether the vehicle an on-off transition is occurring (e.g., the vehicle 100 is going to sleep). If true, the method 200 proceeds to 208. Otherwise, the method 200 ends or returns to 204. At 208, the control system 144 estimates the IOD current. In one exemplary implementation, the initial estimate of the IOD current is conservative (e.g., err towards a higher IOD current) to prevent the low voltage battery system 124 from unintentionally discharging below the critical threshold. This IOD current estimation could be made, for example, based on known (e.g., previously measured) values of IOD current draw by the various module(s) 128. At 212, the control system 144 determines the wakeup time or a wakeup timer for the vehicle 100. This determination is performed, for example, using the estimated IOD current and a set of parameters (e.g., from sensor(s) 148) of at least one of the low voltage battery system 124 and the high voltage battery system 112. Non-limiting examples of these parameters include voltage levels and state of charge (SOC). The set of parameters can also include other relevant parameters, such as ambient temperature and time of day. For example, a wakeup time may be set during the middle of the night and the vehicle may be woken up more often during colder temperatures. At 216, the control system 144 turns off the vehicle 100.

At 220, the control system 144 determines whether the wakeup time has arrived or the wakeup timer has expired. If true, the method 200 proceeds to 224. Otherwise, the method 200 returns to 220. At 224, the control system 144 temporarily wakes up the vehicle 100. This could include closing the main contactor 136 and powering up certain systems necessary for recharging. At 228, the control system 144 determines whether a difference between an expected SOC ($SOC_{EXP}$) for the low voltage battery system 124 and an actual SOC ($SOC_{ACT}$) for the low voltage battery system 124 exceeds a threshold (TH). If true, the previously estimated IOD current was too low and needs to be increased at 232. It will be appreciated that the previously estimated IOD current could also be too high and adjusted lower at 232. If false, the previously estimated IOD current is acceptable and the method 200 proceeds to 236. At 236, the control system 144 controls the DC-DC converter 120 to step down the voltage at the high voltage bus 140 to a lower voltage for recharging the low voltage battery system 124. Once recharging is complete, the method 200 proceeds to 240. At 240, the control system 144 re-determines the wakeup time or wakeup timer and at 244 the control system 144 turns off the vehicle 100. For example, conditions may have changed since the last time the vehicle was on or temporarily woken up (e.g., colder ambient temperature). In this way, the wakeup time is continuously learned based on, for example, changing IOD values. The method 200 then returns to 220 and the process repeats until the vehicle 100 is eventually turned back on by a driver.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an electrified vehicle having low and high voltage battery systems, the control system comprising:
   a set of vehicle modules that collectively draw an ignition-off draw (IOD) current from the low voltage battery system while the vehicle is off;
   a set of sensors configured to measure a set of parameters of at least one of the low and high voltage battery systems; and
   a controller configured to:
      in response to detecting a vehicle on-off transition is occurring:
         estimate the IOD current;
         receive the set of measured parameters from the set of sensors; and
         based on the set of measured parameters and the estimated IOD current, determine a wakeup time indicative of a future time at which the low voltage battery system will require recharging;
      after determining the wakeup time, initiate a wakeup timer based on the wakeup time;
      after initiating the wakeup timer, turn off the vehicle to complete the vehicle on-off transition;
      in response to the wakeup timer expiring, temporarily wakeup the vehicle; and
      upon temporarily waking up the vehicle, control the high voltage battery system to recharge the low voltage battery system.

2. The control system of claim 1, wherein the controller is configured to initially perform a conservative estimate of the IOD current based on which of the set of vehicle modules are active.

3. The control system of claim 2, wherein upon temporarily waking up the vehicle, the controller is further configured to relearn the wakeup time by:
   determining a current state of charge (SOC) of the low voltage battery system;
   based on the estimated IOD current, determining an expected SOC of the low voltage battery system; and
   adjusting the estimated IOD current based on a difference between the current and expected SOC of the low voltage battery system thereby providing for continuing relearning of the wakeup time.

4. The control system of claim 1, wherein the set of parameters includes at least one of a capacity of the low voltage battery system, ambient temperature, a state of charge of the low and high voltage battery systems before the vehicle was turned off, and a time of day.

5. The control system of claim 1, further comprising a main contactor disposed between a direct current to direct current (DC-DC) converter and the high voltage battery system, the DC-DC converter also being connected to the low voltage battery system,
   wherein the controller is configured to open the main contactor while the vehicle is off and close the main contactor while the vehicle is temporarily woken up such that the DC-DC converter steps down a voltage of the high voltage battery system for recharging of the low voltage battery system.

6. The control system of claim 1, wherein the vehicle is a plug-in hybrid electric vehicle (PHEV) that is configured to recharge the high voltage battery system via wall power, and wherein the set of parameters includes a current state of charge (SOC) of the high voltage battery system.

7. The control system of claim 1, wherein the set of vehicle modules includes at least one of a body controller module, an on-board charger module, a power inverter module, a battery pack control module, and an intelligent battery sensor.

8. The control system of claim 1, wherein the set of vehicle modules includes any vehicle modules actively communicating on a controller area network (CAN).

9. A method for controlling recharging of a low voltage battery system of an electrified vehicle that also includes a high voltage battery system, the method comprising:
   operating a set of vehicle modules that collectively draw an ignition-off draw (IOD) current from the low voltage battery system while the vehicle is off;

receiving, by a control system of the vehicle and from a set of sensors, a set of measured parameters of at least one of the low and high voltage battery systems;

in response to detecting a vehicle on-off transition is occurring:
   estimating, by the control system, the IOD current; and
   based on the set of measured parameters and the estimated IOD current, determining, by the control system a wakeup time indicative of a future time at which the low voltage battery system will require recharging;

after determining the wakeup time, initiating, by the control system, a wakeup timer based on the wakeup time;

after initiating the wakeup timer, turning off, by the control system, to complete the vehicle on-off transition;

in response to the wakeup timer expiring, temporarily waking up, by the control system, the vehicle; and while the vehicle is temporarily awake, controlling, by the control system, the high voltage battery system to recharge the low voltage battery system.

10. The method of claim 9, further comprising initially performing, by the control system, a conservative estimate of the IOD current based on which of the set of vehicle modules are active.

11. The method of claim 10, wherein the method further comprises upon temporarily waking up the vehicle, relearning the wakeup time by:
   determining, by the control system, a current state of charge (SOC) of the low voltage battery system;
   based on the estimate IOD current, determining, by the control system, an expected SOC of the low voltage battery system; and
   adjusting, by the control system, the estimated IOD current based on a difference between the current and expected SOC of the low voltage battery system thereby providing for continuing relearning of the wakeup time.

12. The method of claim 9, wherein the set of parameters includes at least one of a capacity of the low voltage battery system, ambient temperature, a state of charge of the low and high voltage battery systems before the vehicle was turned off, and a time of day.

13. The method of claim 9, wherein a main contactor is disposed between a direct current to direct current (DC-DC) converter and the high voltage battery system, the DC-DC converter also being connected to the low voltage battery system, and further comprising:
   opening, by the control system, the main contactor while the vehicle is off; and closing, by the control system, the main contactor while the vehicle is temporarily woken up such that the DC-DC converter steps down a voltage of the high voltage battery system for recharging of the low voltage battery system.

14. The method of claim 9, wherein the vehicle is a plug-in hybrid electric vehicle (PHEV) that is configured to recharge the high voltage battery system via wall power, and wherein the set of parameters includes a current state of charge (SOC) of the high voltage battery system.

15. The method of claim 9, wherein the set of vehicle modules includes at least one of a body controller module, an on-board charger module, a power inverter module, a battery pack control module, and an intelligent battery sensor.

16. The method of claim 9, wherein the set of vehicle modules includes any vehicle modules actively communicating on a controller area network (CAN).

17. A control system for an electrified vehicle having low and high voltage battery systems, the control system comprising:
   a set of vehicle modules that collectively draw an ignition-off draw (IOD) current from the low voltage battery system while the vehicle is off;
   a set of sensors configured to measure a set of parameters of at least one of the low and high voltage battery systems; and
   a controller configured to;
      estimate the IOD current, including initially performing a conservative estimate of the IOD current based on which of the set of vehicle modules are active;
      receive the set of measured parameters from the set of sensors;
      based on the set of measured parameters and the estimated IOD current, set a wakeup time indicative of a future time at which the low voltage battery system will require recharging;
      based on the wakeup time, temporarily wakeup the vehicle such that recharging of the low voltage battery system using the high voltage battery system is enabled; and
      relearn the wakeup time by:
         determining a current state of charge (SOC) of the low voltage battery system;
         based on the estimated IOD current, determining an expected SOC of the low voltage battery system; and
         adjusting the estimated IOD current based on a difference between the current and expected SOC of the low voltage battery system thereby providing for continuing relearning of the wakeup time.

* * * * *